United States Patent
Marson et al.

(10) Patent No.: US 12,353,549 B2
(45) Date of Patent: Jul. 8, 2025

(54) METHOD AND SYSTEM FOR THWARTING ATTACKS ON MACHINE-LEARNING AS A SERVICE

(71) Applicant: NEC Laboratories Europe GmbH, Heidelberg (DE)

(72) Inventors: Giorgia Marson, Heidelberg (DE); Sebastien Andreina, Heidelberg (DE); Pascal Zimmer, Bochum (DE); Ghassan Karame, Bochum (DE)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 18/055,849

(22) Filed: Nov. 16, 2022

(65) Prior Publication Data

US 2024/0045959 A1 Feb. 8, 2024

Related U.S. Application Data

(60) Provisional application No. 63/395,366, filed on Aug. 5, 2022.

(51) Int. Cl.
*G06F 21/56* (2013.01)

(52) U.S. Cl.
CPC ...... *G06F 21/566* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2015/0379072 A1* | 12/2015 | Dirac | G06N 20/00 707/693 |
| 2018/0082058 A1* | 3/2018 | Ferragut | G06F 21/552 |
| 2020/0234068 A1* | 7/2020 | Zhang | G06F 18/2413 |
| 2020/0293941 A1* | 9/2020 | Bos | G06N 20/00 |
| 2021/0303695 A1* | 9/2021 | Grosse | G06N 3/08 |
| 2021/0374279 A1* | 12/2021 | Zheng | G06N 3/088 |
| 2022/0292685 A1* | 9/2022 | Heisler | G06T 7/11 |

OTHER PUBLICATIONS

Chen, Jianbo et al.; "HopSkipJumpAttack: A Query-Efficient Decision-Based Attack"; *2020 IEEE Symposium on Security and Privacy (SP)*; Apr. 28, 2020; pp. 1277-1294; vol. 5; arXiv.org, Cornell University; Ithaca, NY, USA.
Jia, Jinyuan et al.; "MemGuard: Defending against Black-Box Membership Inference Attacks via Adversarial Examples"; *26th ACM Conference on Computer and Communications Security*; Dec. 18, 2019; pp. 1-16; vol. 3; ISBN 978-1-4503-6747-9; ACM Publications; New York, NY, USA.

(Continued)

*Primary Examiner* — Raqiul A Choudhury
(74) *Attorney, Agent, or Firm* — Leydig, Voit & Mayer, Ltd.

(57) ABSTRACT

A method for thwarting attacks on a machine-learning (ML) model is provided. The method includes determining, by the ML model, a classification vector based on an input. The method further includes evaluation the classification vector based on a threshold parameter to determine a threshold result. The method also includes outputting a classification prediction based on the threshold result.

14 Claims, 7 Drawing Sheets

(56) References Cited

OTHER PUBLICATIONS

Aithal, Manjushree B. et al.; "Boundary Defense Against Black-box Adversarial Attacks"; *2022 26th International Conference on Pattern Recognition (ICPR)*; Jan. 31, 2022; pp. 2349-2356; arXiv.org, Cornell University; Ithaca, NY, USA.

Taran, Olga et al.; "Machine learning through cryptographic glasses: combating adversarial attacks by key-based diversified aggregation"; *EURASIP Journal on Information Security*; Jun. 1, 2020; pp. 1-18; vol. 10; Springer; Berlin/Heidelberg, Germany.

Sharad, Kumar et al.; "On the Security of Randomized Defenses Against Adversarial Samples"; *15th ACM Asia Conference on Computer and Communications Security*; Mar. 16, 2020; pp. 1-14; vol. 4; ISBN 978-1-4503-6750-9; ACM Publications; New York, NY, USA.

Wang, Derui et al.; "Defending against Adversarial Attack towards Deep Neural Networks via Collaborative Multi-Task Training";*IEEE Transactions on Dependable and Secure Computing*; Jul. 24, 2020; pp. 1-13; vol. 4; arXiv.org, Cornell University; Ithaca, NY, USA.

Ilyas, Andrew et al.; "Black-box Adversarial Attacks with Limited Queries and Information"; *Proceedings of the 35th International Conference on Machine Learning*; Apr. 23, 2018; pp. 10; arXiv.org, Cornell University; Ithaca, NY, USA.

Tayyab, Muhammad et al.; "Cryptographic Based Secure Model on Dataset for Deep Learning Algorithms"; *Computers, Materials & Continua*; Apr. 5, 2021; pp. 1183-1200; vol. 69, No. 1; Tech Science Press; Henderson, NV, USA.

Li, Deqiang et al.; "HashTran-DNN: A Framework for Enhancing Robustness of Deep Neural Networks against Adversarial Malware Samples"; *Cryptography and Security*; Sep. 18, 2018; pp. 1-14; arXiv.org, Cornell University; Ithaca, NY, USA.

Goodfellow, Ian et al.; "Evaluation Methodology for Attacks Against Confidence Thresholding Models"; *ICLR 2019 Conference Paper*; Sep. 28, 2018; pp. 1-12; Springer; Berlin/Heidelberg, Germany.

\* cited by examiner

METHOD AND SYSTEM FOR THWARTING ATTACKS ON MACHINE-LEARNING AS A SERVICE

CROSS-REFERENCE TO PRIOR APPLICATION

Priority is claimed to U.S. Provisional Application No. 63/395,366, filed on Aug. 5, 2022, the entire contents of which is hereby incorporated by reference herein.

FIELD

The present disclosure relates to a method, system and computer-readable medium for thwarting query-based attacks on machine-learning as a service (MLaaS).

BACKGROUND

With the advent of the digitalization, machine-learning techniques (e.g., machine-learning or artificial intelligence models and/or algorithms), in particular deep neural networks, have found their way into many practical applications that benefit from automatic predictions (e.g., computer vision, language processing, and other domains).

Even though machine-learning has found broad applicability and its concepts are well studied, surprisingly little research has been conducted regarding the inner workings of its models and the fragility those models suffer from manipulations at the model inputs. For instance, adversarial samples may pose severe threats to the application of machine-learning in safety-critical domains (e.g., autonomous driving or facial recognition). For example, in the context of image classification, adversarial samples may manage to deceive a classifier (e.g., a machine-learning model) with carefully crafted and visually almost imperceptible perturbations applied to an input image. This results in (un-)targeted misclassification with identical semantic information to the human eye.

SUMMARY

In an embodiment, the present disclosure provides a method for thwarting attacks on a machine-learning (ML) model. The method comprises: determining, by the ML model, a classification vector based on an input; evaluating the classification vector based on a threshold parameter to determine a threshold result; and outputting a classification prediction based on the threshold result.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
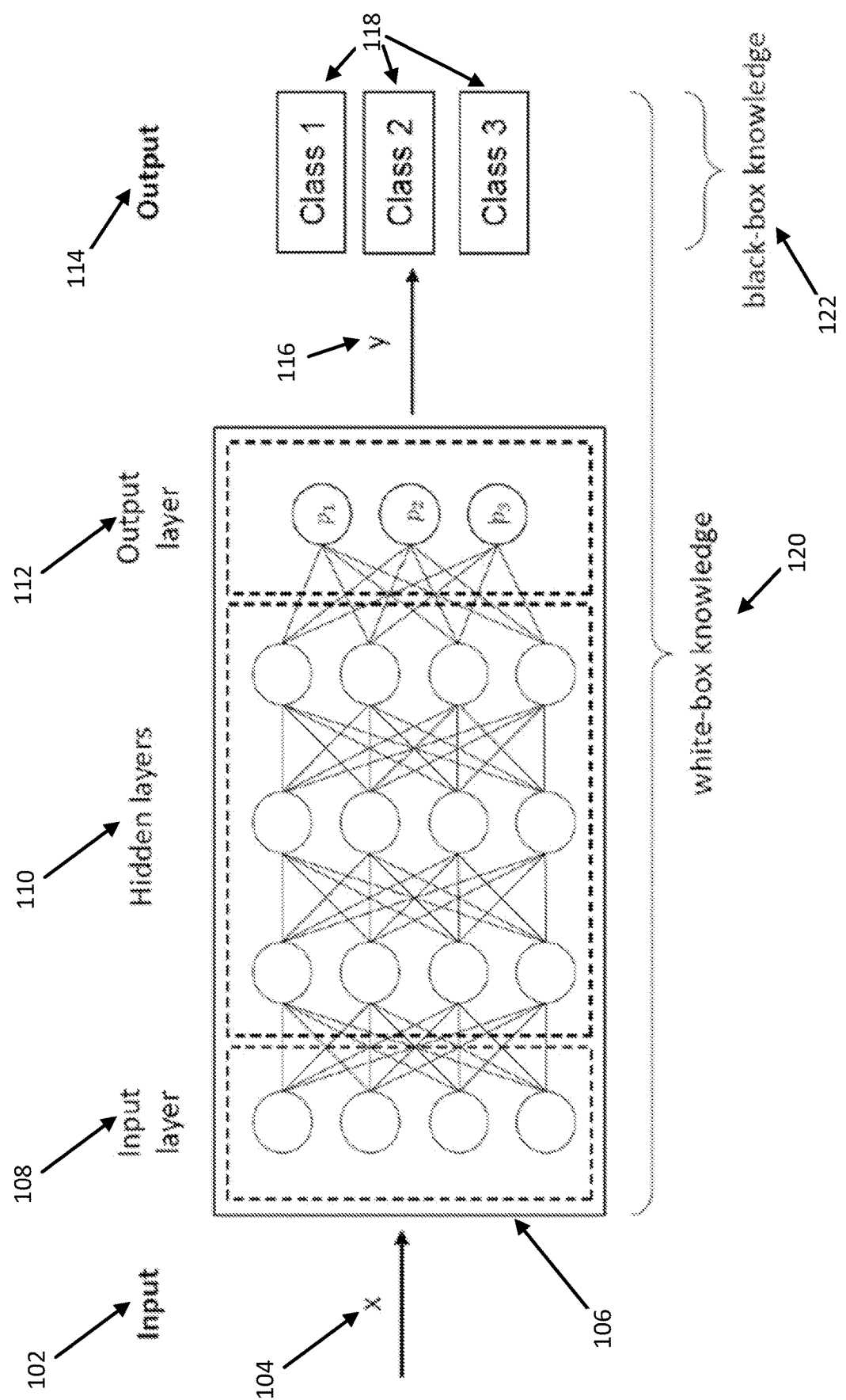
FIG. 1 illustrates an overview of knowledge available to an attacker in a white-box setting and black-box setting according to an embodiment of the present disclosure.

Aspects of the present disclosure provide a method and system to mitigate evasion attacks against machine-learning (ML) classifiers in a particular setting (e.g., a black-box setting). For instance, the present disclosure describes a defensive method that is based (at least in part) on returning a random or pseudo-random output on low-confidence input samples in order to thwart gradient estimation in a query-based attack. Advantageously, embodiments implementing aspects of the present disclosure drastically reduce the convergence of the attack (as compared to the state of the art) and effectively prevent the attack. In some examples, the embodiments of the present disclosure are used for machine-learning and/or artificial intelligence models or algorithms, which may be related to neural networks (NN) and/or image classification. However, in other examples, embodiments of the present disclosure are used for other types of ML-artificial intelligence (AI) models and/or are used for other tasks performed by the ML models. For instance, while image classification and neural networks are used as examples below, the embodiments of the present disclosure (e.g., the attack and the defense described below) are relevant to any ML model and for any ML task.

Accordingly, embodiments of the present disclosure describe a defense (e.g., a computer-implemented technique enhancing machine-learning models) that is able to effectively thwart convergence. There are currently no known adaptive attack strategies against this defense. The present disclosure thereby provides specific, unique mechanisms that provide a solution to the problem of evasion attacks in the field of machine-learning software arts.

For example, in one implementation, aspects of the present disclosure provide a mechanism that:

1) Prevents attack convergence by returning a random (pseudo-random) class or result for low confidence input samples; and/or
2) Ensures that multiple queries of the same sample returns (e.g., always returns) the same output, regardless of the initial confidence. In some instances, this is performed using key-based (e.g., cryptographic key-based) randomness.

Furthermore, aspects of the present disclosure provide mechanisms for thwarting query-based attacks on MLaaS. In some embodiments, the mechanism comprises:

1) Deploying as a service an ML model C than takes as input x and outputs a classification vector $\tilde{C}(x)$. The system is further bootstrap with a key K.
2) Upon reception of an input x' that could potentially be used to craft an adversarial sample, the service first evaluates the classification vector $\tilde{y}'=\tilde{C}(x')$.
3) Given a threshold $\omega \in [0,1]$, if $\max(\tilde{y}') \geq \omega$, the system returns $\max(\tilde{y}')$.

4) Else, if max(ŷ')<ω, the system first computes an index using a password-based function PBF(K, x'):
   a. index←PRF(K, x') mod 2 (Here PBF could be the well defined HMAC(K, x')), which is described below
   b. top2←2 highest classes of ŷ'
   c. Return top2[index]

In an embodiment, the present invention provides a method for thwarting attacks on a machine-learning (ML) model, the method comprising: determining, by the ML model, a classification vector based on an input; evaluating the classification vector based on a threshold parameter to determine a threshold result; and outputting a classification prediction based on the threshold result.

In an embodiment, the method further comprises: based on the threshold result: selecting a highest ranked classification from the classification vector as the classification prediction; or pseudo-randomly determining a classification from a classification set as the classification prediction.

In an embodiment, the pseudo-randomly selecting the classification from the classification set is constrained such that a same classification is selected upon each execution of the method for a same sample provided as the input.

In an embodiment, the method further comprises: generating a secret cryptographic key associated with the ML model, wherein the pseudo-randomly selecting the classification comprises a key-based random selection using the secret cryptographic key.

In an embodiment, the pseudo-randomly selecting the classification further comprises: executing a password-based function (PBF) to compute an index using the input and the secret cryptographic key; and determining the classification based on the index.

In an embodiment, the PBF comprises a pseudo-random function (PRF), wherein executing the PBF comprises: using the input, the secret cryptographic key, and the PRF to generate a plurality of bits associated with the index.

In an embodiment, executing the PBF to compute the index further comprises: determining the index based on a modulus operation and the plurality of bits.

In an embodiment, the plurality of bits indicates two classifications from the classification set, and wherein determining the index comprises: using one or more bits from the plurality of bits to determine the index from the two classifications indicated by the plurality of bits.

In an embodiment, the selecting of the highest ranked classification from the classification vector uses a maximum operation executed on the classification vector.

In an embodiment, the threshold parameter is set to indicate whether the classification vector represents a low confidence region for outputs from the ML model.

In an embodiment, the ML model is a neural network model trained to provide image classification, facial recognition, or autonomous driving.

In an embodiment, the method further comprises deploying, by a cloud computing platform, the ML model as a ML as a service (MLaaS).

In another embodiment, the present invention provides a cloud computing system for thwarting attacks on a machine-learning (ML) model, the cloud computing system comprising: one or more processors; and a non-transitory computer-readable medium having processor-executable instructions stored thereon, wherein the processor-executable instructions, when executed by the one or more processors, facilitate: determining, using the ML model, a classification vector based on an input; evaluating the classification vector based on a threshold parameter to determine a threshold result; and outputting a classification prediction based on the threshold result.

In an embodiment, the instructions, when executed by the one or more processors, further facilitate: based on the threshold result: selecting a highest ranked classification from the classification vector as the classification prediction; or pseudo-randomly determining a classification from a classification set as the classification prediction.

In a further embodiment, a tangible, non-transitory computer-readable medium having instructions thereon which, upon being executed by one or more processors, alone or in combination, provide for execution of a method according to any embodiment of the present invention.

As mentioned above, adversarial samples (provided as input to the ML model) may pose severe threats to the applications in safety-critical domains, such as autonomous driving, and/or facial recognition. In an attempt to design more efficient attacks that aim to generate adversarial samples as well as defenses that strive to protect remote classifiers and mitigate adversarial inputs, an arms race among researchers has been sparked. Originally, attacks that generate adversarial samples have been proposed for a so-called white-box model, in which an attacker has full domain knowledge (e.g., model architecture and trained parameters of a machine-learning model are known to an attacker, such as a malicious entity). Evaluating defenses in this setting has led to an extension to the adaptive white-box model, in which an attacker is also aware of existing defenses, enabling the attacker to incorporate this knowledge into an attack and bypassing any defenses in place.

More recently, attacks have been proposed at the other extreme, the black-box model, in which an attacker has no knowledge about the classifier (e.g., the machine-learning model) and its internals whatsoever and is only able to observe any outputs to supplied inputs (e.g., oracle access). For instance, the black-box model may be when the model architecture and trained parameters of a machine-learning model are not known to an attacker such as a malicious entity. While evaluations in this model consider protected classifiers, the attacks have never been made adaptive to circumvent any defenses in place. Hence, it remains unclear whether these adaptive attacks are also effective in the black-box model.

Traditionally, many proposed defenses have been seemingly defeated in the most common, yet extreme white-box model, making the entire area look rather pessimistic, as no real protection against the generation of adversarial samples seems to exist (other than the computationally intensive method of adversarial training).

In order to establish a more realistic picture of this field and to address the apparent fragmentation, the present disclosure defines a threat model (e.g., a black-box or an adaptive gray-box model) that provides a more accurate model to depict realistic deployment scenarios of machine-learning classifiers and the abilities and knowledge that an adversary has in this setting. In contrast to the white-box model—in which an attacker has essentially the same knowledge as a defender, which is unrealistic for a practical deployment of a classifier (e.g., a machine-learning model), the present disclosure limits the attacker's interactions to a black-box setting with some domain knowledge. The attacker may be aware of any defense in place, making him adaptive, while the possibility of some information leaks towards the attacker is also considered. Such information leaks could, for example, include leaks of hyper-parameters or a portion of the data used for training, making it a blend between the white-box and black-box model.

Aspects of the present disclosure were developed and evaluated with respect to a defense based on confidence thresholding, in which an attacker is presented with the label of a random choice among the two highest output probabilities when the model is uncertain (low confidence). This makes it more difficult for the attacker to navigate around the input space and, therefore, slows down convergence. Embodiments of the present disclosure, which include practically mitigating query-based attacks, are described in further detail below.

Query-Based Attacks

A widely-used type of black-box attack strategy for generating adversarial samples is the "query-based attack," which is based on a realistic deployment of an ML classifier in the cloud, such as a MLaaS (Machine-learning as a Service) computing platform. The query-based attacks do not rely on a surrogate classifier aimed at emulating the target classifier and, thus, do not require knowledge of the training data (in contrast to transfer-based attacks). By sending carefully crafted inputs to the classifier and observing its outputs, an attacker is able to explore the input space and generate adversarial samples.

In this setting, the present disclosure further differentiates between the amount of information that is revealed to an attacker (e.g., a malicious computing entity). While a white-box setting assumes full knowledge of model architecture, trained parameters, and any other parameters, score-based attacks assume only the knowledge of output probabilities for each class, while decision-based attacks only work with the output label with the highest probability. The different threat models along with a machine-learning model are depicted in FIG. 1. For instance, FIG. 1 illustrates an overview of knowledge 100 available to an attacker in a white-box setting and black-box setting according to an embodiment of the present disclosure.

As shown, FIG. 1 includes an input 102. For instance, the input 102 may include input parameters such as "x" 104. For example, as mentioned below, the input parameters 104 may include red, green, blue (RGB) color values from images. The input parameters 104 are input into a machine-learning (ML) model 106 (e.g., a deep learning model such as a NN and/or image classification model). The ML model 106 (e.g., a classifier) may provide an output 114 such as one or more classes 118. The ML model 106 includes an input layer 108, hidden layers 110, and an output layer 112. For instance, the input layer 108 (e.g., denoted by the first dashed box within the ML model 106) may be the layer that brings the initial data (e.g., the input parameters 104) into the ML model 106 for further processing by subsequent layers. Each of the layers may include nodes or neurons that are linked to other layers/nodes via connectors. One or more weights may be associated with each of the connectors and based on the weights, each node may move to another node within the next layer. For instance, the top node of the input layer 108 may include four connectors with four different weights. Each of the four connectors is connected to a node of the next layer (e.g., a node within the hidden layers 110). While only four nodes are shown in the input layer 108, the input layer 108 may include any number of nodes as well as any number of connections to the next level of the ML model 106.

A number of hidden layers 110 are located between the input layer 108 and the output layer 112. The functions of the ML model 106 may apply weights to the hidden layer inputs and direct them through an activation function as hidden layer outputs. For instance, the hidden layers may perform transformations (e.g., non-linear transformations and/or gradients) of the inputs entered into the ML model 106. The output layer 112 is a final layer of the ML model 106 where the desired predictions may be obtained (e.g., probability values $p_1$, $p_2$, and $p_3$). While the hidden layers 110 are shown to include three layers with twelve total nodes, the hidden layers 110 may include any number of layers and any number of nodes with connections/weights that connect the nodes to each other. While only three nodes are shown in the output layer 112, the output layer 112 may include any number of nodes indicating any number of output values (e.g., probability values). Based on the input parameters, x, 104 being input into the ML model 106 and the processing by the layers of the ML model 106 (e.g., the weights/layers of the input layer 108, hidden layers 110, and output layer 112), the ML model 106 provides an output 114. For instance, the output 114 may be one or more output values 116 such as a probability value. The output 114 may be associated with a number of classes 118 such as a first class ("class 1"), a second class ("class 2"), and a third class ("class 3"). While only three classes are shown, the output 114 may include any number of classes. As such, the ML model 106 may be a classifier that provides a classification result (e.g., a first class or a third class) based on the input parameters 104.

As shown, using white-box knowledge 120, the ML model 106 including the nodes, weights, output 114 (e.g., the classes 118) may be known to an attacker (e.g., a malicious computing entity). Using black-box knowledge 122, only the output 114 such as the classes 118 are known to the attacker.

In FIG. 1, the attacker creates each adversarial sample x' (e.g., the input x) starting with an initial, "tentative" adversarial sample $x'_0$ and by progressively perturbing it, generates a sequence of intermediate samples $x'_j$, with j=1, . . . , Q, based on the classification result $C(x'_{j-1})$. For instance, the attacker generates a first adversarial sample $x'_0$ and inputs the generated first adversarial sample $x'_0$ into the ML model 106 to generate an output 114. The output 114 may be a classification result (e.g., a result of using the classifier/the ML model 106). Then, the attacker may perturb the first adversarial sample $x'_0$ to generate a second adversarial sample $x'_1$ based on the classification result of the first adversarial sample. The second adversarial sample $x'_1$ is input into the ML model 106 to determine a classification result (e.g., $C(x'_0)$). The attacker may continuously perturb and generate adversarial samples (e.g., the sequence of intermediate samples $x'_j$ with j being the number of different generated adversarial samples and Q being the last adversarial sample of the set) based on the classification result from the previous output 114 of the ML model 106. For instance, in some examples, the attacker may continuously update the perturbation to improve or attempt to reach their goal (e.g., an image with very low distortion that becomes misclassified).

In contrast to white-box attacks, in which the trained model parameters (e.g., the weights from the models) can be used to derive gradients and hence easily compute adversarial samples, some attacks (e.g., the HopSkipJumpAttack) are deriving a surrogate gradient solely based on the observed top-1 outputs (e.g., the top output) of the classifier to further explore the decision boundary for computing adversarial samples. The HopSkipJumpAttack is described by Chen et al. See, e.g., Jianbo Chen, Michael I. Jordan, and Martin J. Wainwright. "HopSkipJumpAttack: Query-Efficient Decision-Based Attack". In: 2020 IEEE Symposium on Security and Privacy (SP). 2020 IEEE Symposium on Security and Privacy (SP). San Francisco, CA, USA: IEEE, May 2020, pp. 1277-1294. isbn: 978-1-72813-497-0. doi: 10.1109/SP40000.2020.00045. url: ieeexplore.ieee.org/document/9152788/(the entire contents of which are hereby incorporated by reference here). After determining the decision boundary, the gradient is used to move along the decision boundary and repeatedly update the intermediate adversarial sample, until a candidate is found that visually looks like the source image, is classified as the target image, while still staying within a given perturbation bound to make sure that the changes are visually imperceptible. A high-level illustration of this concept can be found in FIG. 2.

Figure 2:
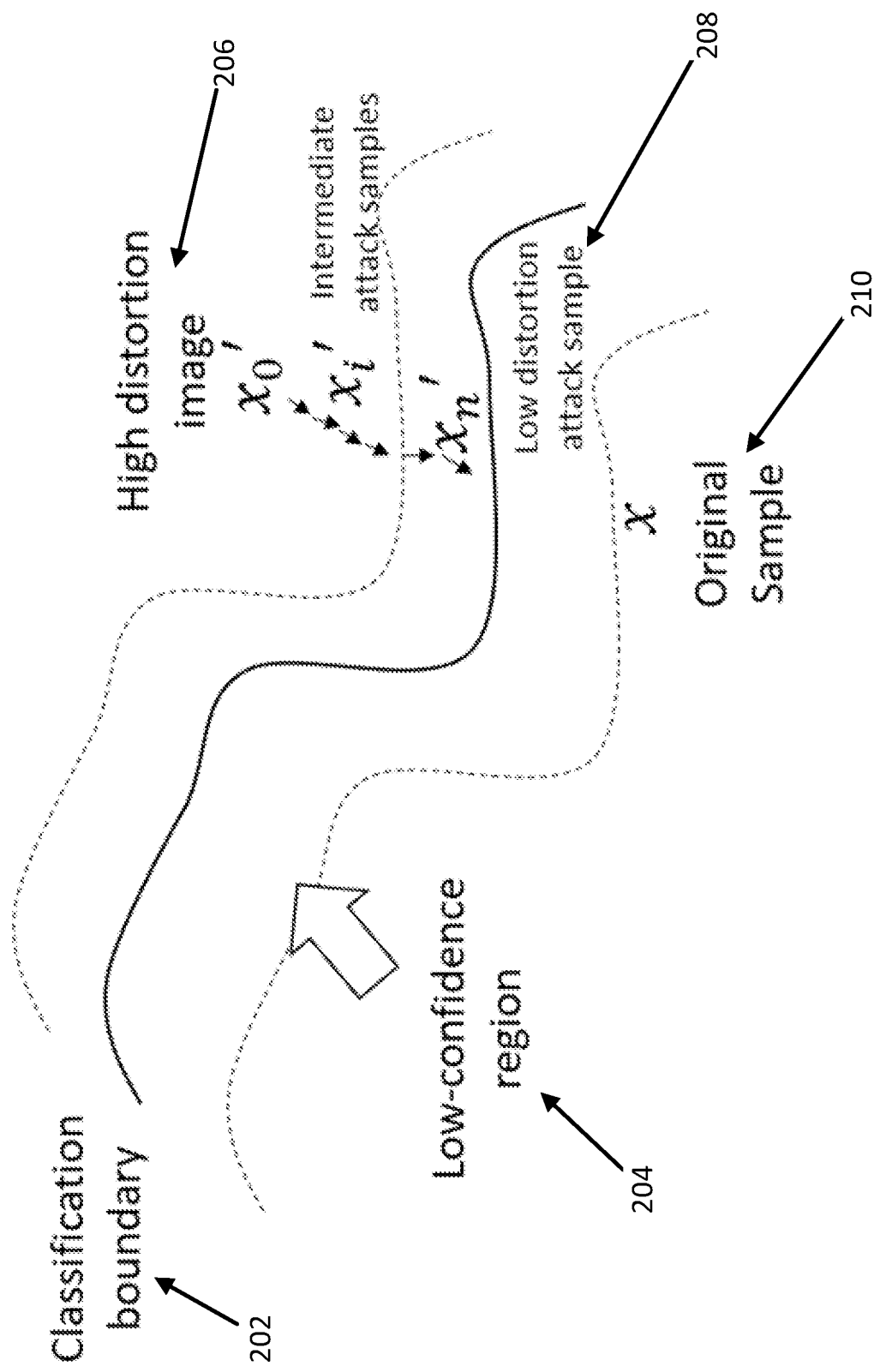
FIG. 2 illustrates a query-based evasion attack according to an embodiment of the present disclosure.

For instance, FIG. 2 illustrates a query-based evasion attack according to an embodiment of the present disclosure. For example, the query-based evasion attack aims at progressively perturbing an initial sample x in order to generate a (high-confidence) adversarial sample x'. The attacker aims to stay close to the decision boundary in order to flip the classifier's prediction and yet preserving similarities with the original sample. As such, the general goal of the attacker is to make a sample cross the decision boundary (e.g., the classification boundary 202). For instance, FIG. 2 shows an environment 200 with a classification boundary 202. The classification boundary 202 may indicate whether to classify a classification result from the ML model 106 into a particular class (e.g., one of the classes 118 such as the first class). On the upper side of the classification boundary, the ML model 106 classifies the result into the particular class such as the first class. On the lower side of the classification boundary is a low-confidence region 204, which the ML model 106 has a low confidence as to whether the particular class is the correct class to classify the input (e.g., x'). The original sample x 210 is shown outside of the low-confidence region 204. A high distortion image 206 is initially shown above the classification boundary 202, which indicates that it may start with a classification result that is on the upper side of the classification boundary for the particular class. Then, by perturbing the sample (e.g., the generation of a sequence of intermediate samples 212), the classification results approach closer and closer to the classification boundary 202 so as to reach the low-confidence region 204. The low distortion attack sample 208 (e.g., the last perturbation from the original high distortion image) is shown that is at or near the classification boundary 202, which could cause a misclassification.

Confidence Thresholding with a Top-2 Pick

The introduction of adversarial perturbation to genuine images, so called adversarial samples, can severely impact the operation of a deployed classifier (e.g., a deployed ML model such as ML model 106). Adversarial samples add a small perturbation to the input (e.g., the input 102) causing the prediction (e.g., the output 114) to flip such as by changing the classification from class 1 to a different classification result, while it is perceptually indistinguishable to a human observer. For instance, the input of the images (e.g., the RGB values for the pixel values of the images) may be slightly perturbed such that they are perceptually indistinguishable to a human observer, but may cause the prediction to flip (e.g., the object detection within the image to be changed). While image classification and neural networks (e.g., the ML model 106) are used as an example, the embodiments of the present disclosure (e.g., the attack and the defense described in FIG. 3 and/or the embodiments discussed herein) are relevant to any machine-learning (ML) model and for any ML task.

Figure 3:
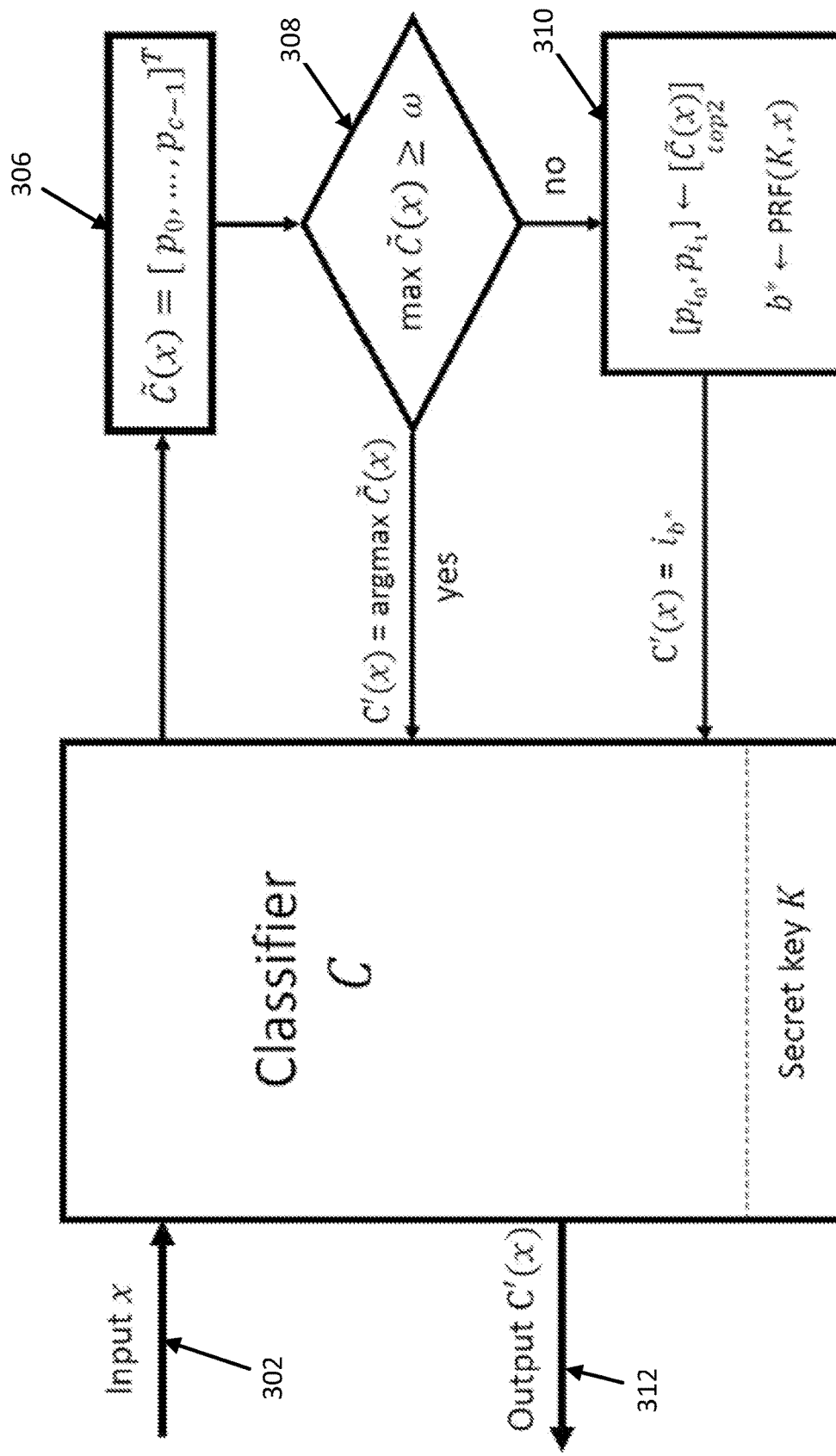
FIG. 3 illustrates a process flowchart for thwarting attacks on Machine-learning as a Service (MLaaS) according to an embodiment of the present disclosure.

For instance, as a mitigation, embodiments of the present disclosure use the following defensive scheme, shown in FIG. 3, that controls the output behavior of the classifier 304 (e.g., the ML model 106). Embodiments of the present disclosure allow a defender to deterministically return one of the two classes with the highest output probability, making it impossible for any party, not in possession of the secret key K, to notice the activation of this scheme by querying a given input multiple times. Embodiments of the present disclosure may be applied in regions of low confidence in the input space (e.g., the low confidence region 204 shown in FIG. 2), which are typical regions of interest for an attacker, hence increasing the difficulty of an attack.

FIG. 3 illustrates a process flowchart 300 for thwarting attacks on MLaaS according to an embodiment of the present disclosure. For example, FIG. 3 shows a process 300 for a classifier 304 based on a deep neural network architecture (e.g., the ML model 106). This classifier 304 performs a classification task C: X→Y, given an underlying classification problem F: X→Y for c:=|Y| distinct classes. For example, a classification problem F may use a classifier 304 (e.g., the ML model 106) to perform the classification task C. By inputting an input X into the classifier 304, the classifier 304 may provide outputs Y. The outputs Y may include a number of distinct classes such as c:=|Y| distinct classes (e.g., the classes c are defined (":=") as having the number of elements in set Y).

Input x 302 is input into the classifier C 304. The input x 302 may be a d dimensional input vector (e.g., input 302 may be a dimensional input vector of size "d"), which may be suitable for a classification task. Suitable candidates for the input x 302, among others, are image data, video data, audio data, or text data. For other types ML tasks or ML models, the input x 302 may include other types of data. Without loss of generality, an underlying image classification problem (e.g., assuming a byte vector of size d=w×h×3, for a 3-channel RGB-image of width w and height h) is described below.

In some embodiments, the present disclosure uses confidence thresholding for defending against attacks (e.g., query-based attacks that are described above). For instance, a classifier C 304 is defined using a softmax layer $\tilde{C}$. A softmax layer may be a softmax function that converts a vector of numbers (e.g., the input x, which may be a vector as described above) into a vector of probabilities (e.g., as shown as the output 306 with the softmax layer $\tilde{C}(x)$). The input x 302 may be a "d" dimensional input that is described above and yields an enhanced classifier C' with a softmax layer C'. For instance, the enhanced classifier may be and/or include the original classifier along with the defense function, which is described in further detail below. The softmax layer may be the last layer of the model, and is used to provide the probabilities for the classes.

This is defined as follows:

$$\tilde{C}'(x) = \begin{cases} D(\tilde{C}(x)), & \text{if } \max \tilde{C}(x) \leq \omega \\ \tilde{C}(x), & \text{otherwise,} \end{cases}$$

where D denotes the defense function (e.g., one or more defense equations that may be used to thwart attacks) and ω denotes the threshold parameter. The classifier's 304 prediction or output is the label (e.g., class) of the highest probability in the softmax layer C'(x)=argmax $\tilde{C}'(x)$, with the defense function D being applied in the case of low confidence. For instance, as shown in the above function, the output for the classifier C 304 may be based on a threshold parameter ω. In some instances, the threshold parameter ω may be pre-set (e.g., pre-determined) and/or may be fine-tuned based on the scenario (e.g., based on the classifier 304). In some instances, the threshold parameter may be between 0.4 and 0.7. Based on the maximum of $\tilde{C}(x)$ (e.g., the maximum probability or maximum value indicated within the vector of probabilities $\tilde{C}(x)$) being less than or equal to the threshold parameter, then the defense function D may be applied. Otherwise, the output for the classifier C 304 may be based on the softmax layer $\tilde{C}(x)$.

For example, referring back to FIG. 2, using an input (e.g., input x 206 or input 302), a classification result may be provided by a classifier C 304 (e.g., the ML model 106). The classification result may be within a low-confidence region 204 or outside the low-confidence region 204, which as described above. The low-confidence region 204 is typically a region of interest for an attacker. The above example uses a threshold parameter ω (e.g., a threshold parameter associated with the classification boundary 202) to determine whether the classification result is within the low-confidence region 204. If the result is within the low-confidence region 204 (e.g., if the maximum probability within $\tilde{C}$ is less than or equal to the threshold parameter), then a defense function D is used on $\tilde{C}(x)$ (e.g., $D(\tilde{C}(x))$). For instance, if the threshold parameter is 0.7 and the maximum probability within C is less than (e.g., the maximum probability indicating the most likely class is less than 0.7), then a defense function may be used. Otherwise, if the result is not within the low-confidence region 204 (e.g., above the classification boundary 202 indicating a high confidence that the classification result is accurate, which is indicated by the maximum probability being greater than the threshold parameter), then the regular operation/output of the classifier 304 is provided ($\tilde{C}(x)$).

The regular operation/output of the classifier 304 may use an argmax operation and/or a max operation (e.g., a maximum operation) to obtain the output 312. For instance, the argmax operation returns the class with the highest probability (e.g., the class is returned and not the probability itself), and thus, the classification result (e.g., the output 312) returned by the classifier C 304 is the class with the greatest probability value within $\tilde{C}(x)$. Therefore, if the maximum probability within $\tilde{C}$ is greater than the threshold parameter (e.g., indicating that the classification result is not within the low-confidence region 204), the defense function D is not used when providing the output 312. Instead, the class with the highest probability is returned.

If the maximum probability is less than or equal to the threshold parameter, then the defense function D is used. For instance, regarding the defense function D, even though the classifier's 304 output can be controlled directly, a method of the present disclosure is to apply a defense function D to the c dimensional output vector $\tilde{C}(x)$ that includes the probabilities for each of the c output classes, where c is a number defined by the number of output classes within the vector $\tilde{C}(x)$.

$\tilde{C}(x)$ is modified by the defense function by setting the element at index i∈c to a positive, non-zero value, such as 1, and the other elements at indices j≠i to 0. For instance, $\tilde{C}(x)$ includes a vector of probabilities that are output from the classifier C 304. The vector includes a plurality of elements, and each element is associated with an index number. The method of the present disclosure modifies $\tilde{C}(x)$ such that the element at index i, which is one of the objects in the collection of objects in set c (e.g., i∈c), is set to a positive non-zero value such as 1. The other elements of the vector $\tilde{C}(x)$ that are not at index i are set to 0 (e.g., the other elements at indices j, which are not equal to i are set to 0).

Hence, the present disclosure can control the output of the classifier to be class i in the low-confidence regions 204 of FIG. 2 (e.g., based on the threshold parameter). Determining index i is done by using random function or a pseudo-random function (PRF), denoted by PRF(K, x), where K is the PRF key (e.g., a cryptographic secret key associated with the classifier 304), to either chose the first or the second element of the top-2 picks (e.g., the indices of the two largest values in the softmax vector). For instance, the secret K is used as a seed to the PRF to obtain deterministic randomness. A seed is a number or vector that is used to initialize a PRF.

This is done as follows:

$$D(\tilde{C}(x))i = \begin{cases} 1, & \text{if } i = \left[\begin{array}{c}\tilde{C}(x)\\ \text{top}-2\end{array}\right]_{PRF(K,x)} \\ 0, & \text{otherwise} \end{cases}$$

For instance, the PRF takes as input a sample x and a secret key K of length 1, and it returns B output bits that can be encoded as an index used for the top-2 pick in defense function D. The cryptographic secret K may be provisioned at the setup of the classifier C 304, may be sampled in a uniformly random way, and/or may be only known to the defender. The PRF can be instantiated using a cryptographically secure hash function H with b output bits.

For example, the PRF uses the seed, which is the secret key K, and the sample x to generate a plurality of output bits (e.g., B output bits). The plurality of output bits may indicate one or more classes to be output. For instance, by using the PRF, a pseudo-random class is returned by the defense function (e.g., the class probability is put at 1 while the other class probabilities are put to 0). In other words, the plurality of output bits may be transformed to a random number through one or more algorithms or processes such as by truncating to the bits that are required to determine a class (e.g., for a class of 4, 2 bits may be required) or by using a modulo operation, which is described below. Additionally, and/or alternatively, a top—2 function may be used to select a class from the top two classes indicated by the output bits of the PRF. For instance, based on the first or last bit of the bit string, the top class (e.g., the highest class) or the second class (e.g., the second highest class) may be returned. For example, to convert the bit string to an index number associated with a class, the bit string may indicate two or more classes (e.g., the top class and the second class) using truncating of the bits, a modulo operation and/or processes. Based on the first or last bit of the bit string, the top or the second class may be returned (e.g., if the first bit of the bit string is 1, then the top class is returned and if it is 0, then the second class is returned).

One instantiation used by the present disclosure may rely on the hash-based message authentication code (HMAC) construction, as defined in RFC2104. See, e.g., url: data-tracker.ietf.org/doc/html/rfc2104 (the entire contents of which are hereby incorporated by reference here). This is described as follows:

$$K' = \begin{cases} H(K), & K \text{ is larger than block size} \\ K, & \text{otherwise} \end{cases}$$

For example, the above function is used to reduce the size of K to a size smaller or equal to the block size of the hash function.

For images, the d dimensional input vector is input, consisting of the concatenated bytes of all channels of the image. One way of defining the PRF is to return the last bit of the output of the HMAC construction using modulo operation 2 (mod 2).

$$PRF(K,x) = HMAC(K,x) \bmod 2$$

For instance, a hash-based message authentication code (HMAC) is a standardized function that may be used as a pseudorandom generator seeded by the key K and the input x as described above. Further, a modulo operation 2 (mod 2) is used to determine the output bits indicating the identified pseudo-random classes to be returned from the defense function. The HMAC may be based on a secure hash function such as a secure hash algorithm for 256 bits (SHA256).

In addition, in some embodiments, a tolerance can be introduced on the introduced perturbation of an input, to not only return the same class for the same image, but also for highly similar images. Effectively, this creates a region in the input space in which the classifier exhibits the behavior described above. For instance, the tolerance may be used to prevent that the modification of a single bit in the input yields to a different output due to the PRF having a different input. This may be performed, for example, by truncating the last few bits of each pixel when computing the PRF only, so that when introducing tiny changes, the classification may remain consistent.

For instance, referring to FIG. 3, an input x 302 is provided into a classifier C 304 (e.g., an ML model 106), which may include a softmax function. The input x 302 may be a vector of values and the classifier C 304 may output a vector of probabilities ($p_0, \ldots, p_{c-1}$). As mentioned above, the input x 302 and the classifier C 304 may be related to image classification. In other examples, the classifier C 304 and the input x 302 may be associated with other ML models and/or perform other ML tasks.

At block 306, the output of the classifier C 304 may be $\tilde{C}(x)$, which indicates a plurality of probabilities $[p_0, \ldots, p_{c-1}]$. p0 represents the first probability from $\tilde{C}(x)$ and $p_{c-1}$ represents the last probability in $\tilde{C}(x)$, with c being a number defined by the number of output classes (e.g., there are c number of probabilities provided by $\tilde{C}(x)$). As such, the output of the classifier C 304 is $\tilde{C}(x) = [p_0, \ldots, p_{c-1}]^T$ (e.g., a transpose "T" of the vectors of probabilities $p_0$ to $p_{c-1}$).

At block 308, a threshold parameter ω is applied to the maximum probability within $\tilde{C}(x)$ (e.g., max $\tilde{C}(x) \geq \omega$). For instance, each element within the vector $\tilde{C}(x)$ may include probability values. The maximum probability value within the vector $\tilde{C}(x)$ may be compared to the threshold parameter. Based on the comparison, an output 312 may be provided using an argmax operation or the defense function D may be used by moving to block 310. For instance, based on the maximum probability value being greater than or equal to the threshold value, C'(x)=argmax $\tilde{C}'(x)$ may be used, which indicates that the output 312 of the classifier 304 is an argmax operation of $\tilde{C}'(x)$ (e.g., the class with the highest probability value within $\tilde{C}'(x)$). For instance, if c=10 (e.g., there are 10 output classes), and the highest probability is the $5^{th}$ class, then the output 312 of the classifier 304 may be the $5^{th}$ class and/or the probability associated with the $5^{th}$ class.

Block 310 may be performed based on the maximum probability value within the vector $\tilde{C}(x)$ being below the threshold parameter. Block 310 may correspond to the defense function D described above. For instance, the below two functions may be used:

$$[p_{i0}, p_{i1}] \leftarrow \begin{bmatrix} \tilde{C}(x) \\ \text{top} - 2 \end{bmatrix}$$

$$b^* \leftarrow PRF(K, x)$$

For instance, the key K and the input x may be input into a PRF to generate B output bits. Further, the top 2 of the vector $\tilde{C}(x)$ may be determined to obtain the top 2 probabilities (e.g., $p_{i0}$ and $p_{i1}$). After, block 310 may output $i_{b*}$ (e.g., C'(x)=$i_{b*}$), and the output 312 from the classifier C 304 may be $i_{b*}$. $i_{b*}$ may be the output of the defender function from the classifier and the output 312 may be a class number (e.g., the class index).

Figure 4:
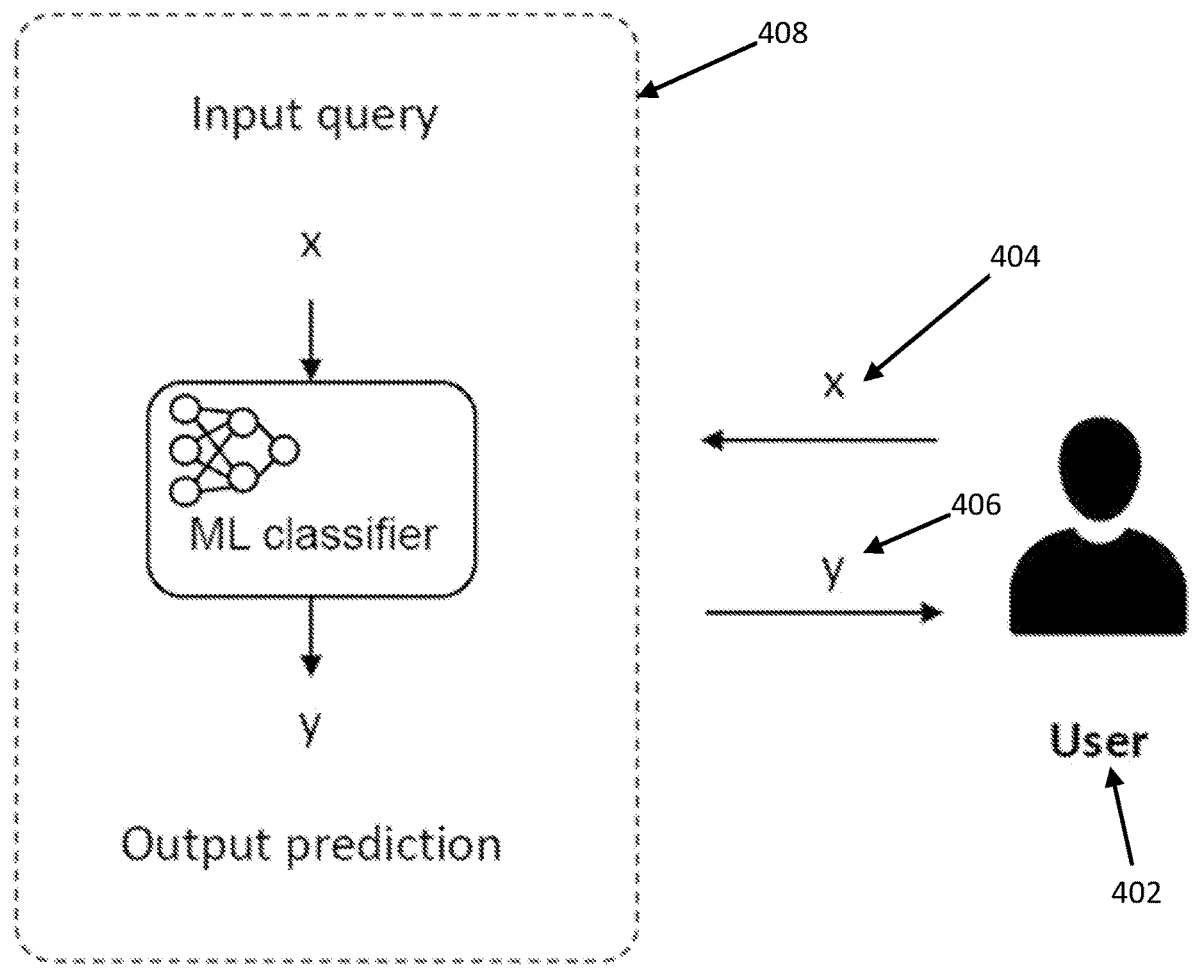
FIG. 4 illustrates using the process flowchart for thwarting attacks on MLaaS according to an embodiment of the present disclosure.

FIG. 4 illustrates using the process flowchart 400 for thwarting attacks on MLaaS according to an exemplary embodiment of the present disclosure. For instance, a user 402 can submit inputs x 404 to a ML classifier 406 deployed in the cloud (e.g., a cloud computing platform) and obtain the classifier's predictions y 408. In such scenario, an attacker can observe the I/O behavior of the classifier via queries.

For the present disclosure, a preferred embodiment considers the realistic case of an interaction with a classifier in the cloud, such as Machine-Learning as a Service scenarios (as illustrated in FIG. 4), where an attacker is able to supply an input x 404 to a classifier 406 and observe its output y 408. However, the attacker has only partial knowledge of the inner working of the classifier 406. Other embodiments capturing similar black-box settings include face-recognition systems and spam-detection systems. For instance, the ML model 106, the classifier C 304, and the processes 300/400 may be used for face-recognition systems and/or spam-detection systems.

Figure 5:
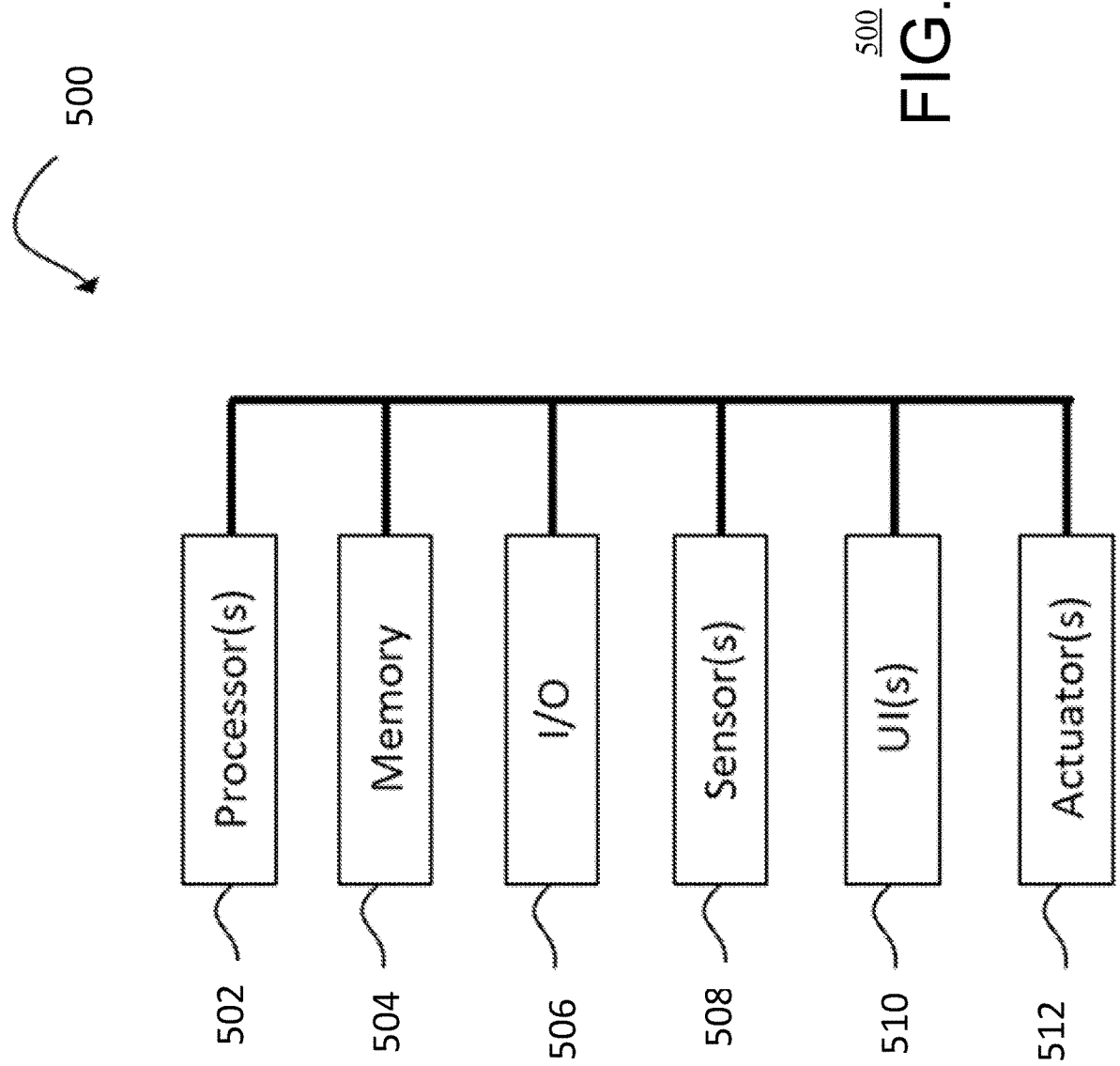
FIG. 5 illustrates an exemplary processing system according to an embodiment of the present disclosure.

FIG. 5 illustrates an exemplary processing system according to an embodiment of the present disclosure. Referring to FIG. 5, a processing system 500 can include one or more processors 502, memory 504, one or more input/output devices 506, one or more sensors 508, one or more user interfaces 510, and one or more actuators 512. Processing system 500 can be representative of each computing system disclosed herein.

Processors 502 can include one or more distinct processors, each having one or more cores. Each of the distinct processors can have the same or different structure. Processors 502 can include one or more central processing units (CPUs), one or more graphics processing units (GPUs), circuitry (e.g., application specific integrated circuits (ASICs)), digital signal processors (DSPs), and the like. Processors 502 can be mounted to a common substrate or to multiple different substrates.

Processors 502 are configured to perform a certain function, method, or operation (e.g., are configured to provide for performance of a function, method, or operation) at least when one of the one or more of the distinct processors is capable of performing operations embodying the function, method, or operation. Processors 502 can perform operations embodying the function, method, or operation by, for example, executing code (e.g., interpreting scripts) stored on memory 504 and/or trafficking data through one or more ASICs. Processors 502, and thus processing system 500, can be configured to perform, automatically, any and all functions, methods, and operations disclosed herein. Therefore, processing system 500 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 500 can be configured to perform task "X". Processing system 500 is configured to perform a function, method, or operation at least when processors 502 are configured to do the same.

Memory 504 can include volatile memory, non-volatile memory, and any other medium capable of storing data. Each of the volatile memory, non-volatile memory, and any other type of memory can include multiple different memory devices, located at multiple distinct locations and each having a different structure. Memory 504 can include remotely hosted (e.g., cloud) storage.

Examples of memory 504 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 504.

Input-output devices 506 can include any component for trafficking data such as ports, antennas (i.e., transceivers), printed conductive paths, and the like. Input-output devices 506 can enable wired communication via USB®, DisplayPort®, HDMI®, Ethernet, and the like. Input-output devices 506 can enable electronic, optical, magnetic, and holographic, communication with suitable memory 506. Input-output devices 506 can enable wireless communication via WiFi®, Bluetooth®, cellular (e.g., LTE®, CDMA®, GSM®, WiMax®, NFC®), GPS, and the like. Input-output devices 506 can include wired and/or wireless communication pathways.

Sensors 508 can capture physical measurements of environment and report the same to processors 502. User interface 510 can include displays, physical buttons, speakers, microphones, keyboards, and the like. Actuators 512 can enable processors 502 to control mechanical forces.

Processing system 500 can be distributed. For example, some components of processing system 500 can reside in a remote hosted network service (e.g., a cloud computing environment) while other components of processing system 500 can reside in a local computing system. Processing system 500 can have a modular design where certain modules include a plurality of the features/functions shown in FIG. 5. For example, I/O modules can include volatile memory and one or more processors. As another example, individual processor modules can include read-only-memory and/or local caches.

Figure 6:
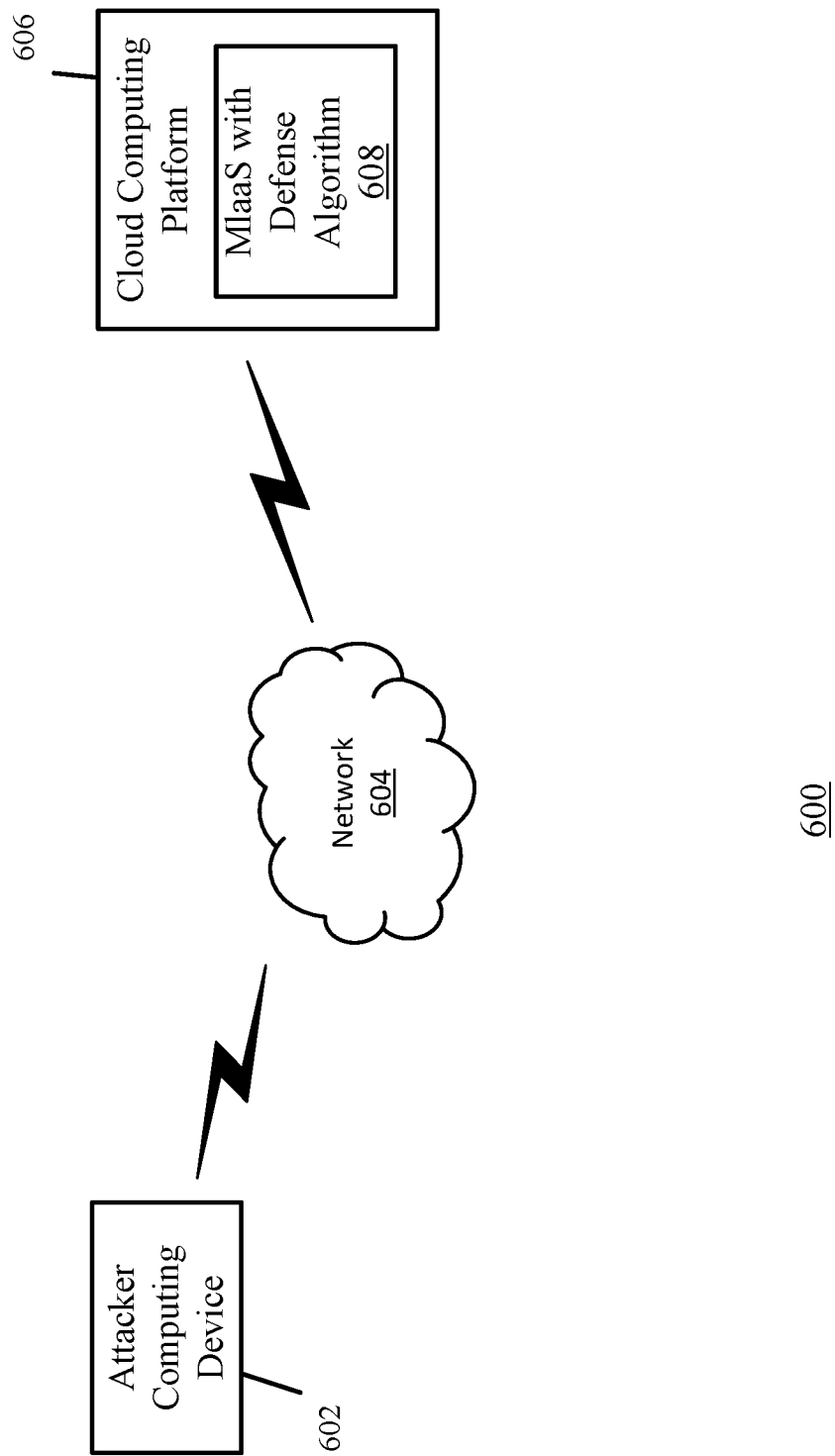
FIG. 6 illustrates a simplified block diagram depicting an exemplary computing environment according to an embodiment of the present disclosure.

FIG. 6 illustrates a simplified block diagram depicting an exemplary computing environment 600 according to an embodiment of the present disclosure. The environment 600 includes an attacker computing device 602, a network 604, and a cloud computing platform 606 (e.g., a cloud server or cloud system). Although certain entities within environment 600 may be described below and/or depicted in the FIGS. as being singular entities, it will be appreciated that the entities and functionalities discussed herein may be implemented by and/or include one or more entities.

The entities within the environment 600 such as the attacker computing device 602 and the cloud computing platform 606 may be in communication with other devices and/or systems within the environment 600 via the network 604. The network 604 may be a global area network (GAN) such as the Internet, a wide area network (WAN), a local area network (LAN), or any other type of network or combination of networks. The network 604 may provide a wireline, wireless, or a combination of wireline and wireless communication between the entities within the environment 600.

The attacker computing device 602 may be a computing device that is operated by an attacker. For instance, as described above, the attacker (e.g., a malicious entity) may use the attacker computing device 602 to create one or more adversarial samples and provide them to the cloud computing platform 606. The adversarial samples may pose severe threats to applications being performed by the cloud computing platform 606 (e.g., the MLaaS) such as autonomous driving, and/or facial recognition. The attacker computing device 602 is and/or includes, but is not limited to, a desktop, laptop, tablet, mobile device (e.g., smartphone device, or other mobile device), server, computing system and/or other types of computing entities that generally comprises one or more communication components, one or more processing components, and one or more memory components.

The cloud computing platform 606 is a computing system that performs one or more functions described herein. For instance, the cloud computing platform 606 may include, execute, operate, and/or otherwise be associated with an MLaaS with a defense algorithm 608 (e.g., defense function D described above). For instance, the MLaaS with the defense algorithm 608 may be the ML model 106 and/or the classifier 304 along with the defense function D as described above in FIGS. 1 and 3. The ML model 106 and/or the classifier 304 along with the defense function D may be operated by a cloud computing platform 606 (e.g., performed in the cloud). The cloud computing platform 606 includes and/or is implemented using one or more computing devices, computing platforms, cloud computing platforms, systems, servers, and/or other apparatuses. In some instances, the cloud computing platform 606 and/or the attacker computing device 602 may be implemented as engines, software functions, and/or applications. For example, the functionalities of the cloud computing platform 606 may be implemented as software instructions stored in storage (e.g., memory) and executed by one or more processors.

Figure 7:
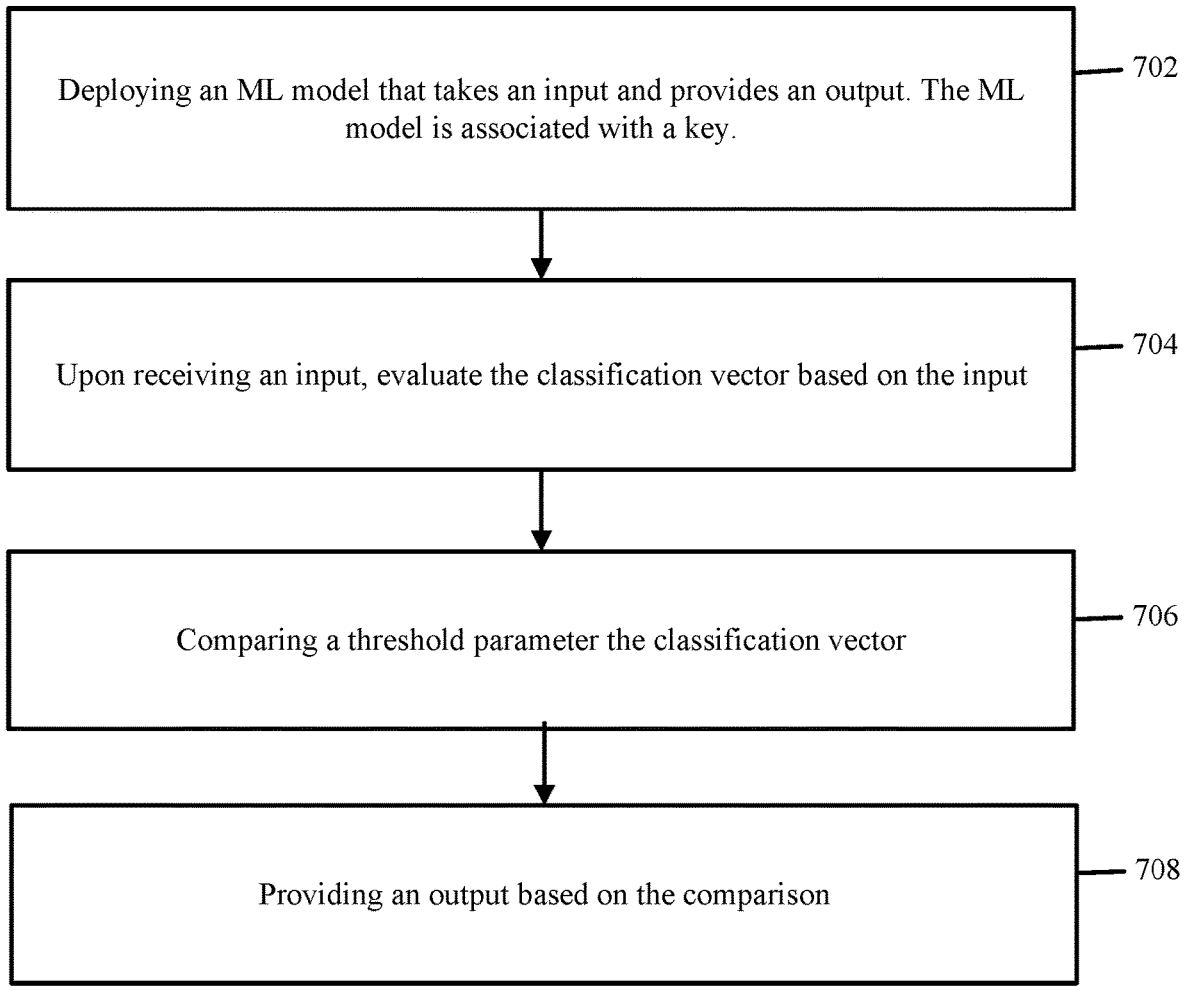
FIG. 7 illustrates a process for thwarting attacks on MLaaS according to an embodiment of the present disclosure.

FIG. 7 illustrates a process for thwarting attacks on MLaaS according to an embodiment of the present disclosure. At block 702, a cloud computing platform (e.g., cloud computing platform 606 of FIG. 6) deploys an ML model (e.g., the ML model 106 and/or the classifier 304) that takes an input and provides an output. The ML model is associated with a key K. For instance, the cloud computing platform may deploy an MLaaS (e.g., classifier C 304), which provides an output (e.g., a classification vector $\tilde{C}(x)$) based on an input x. The cloud computing platform may further be bootstrapped with a key K (e.g., a secret cryptographic key). For instance, the key K may be provisioned at the setup of the classifier C 304, may be sampled in a uniformly random way, and/or may be only known to the defender.

At block 704, upon receiving an input, the cloud computing platform evaluates (e.g., determines) a classification vector (e.g., $\tilde{y}'=\tilde{C}(x')$) associated with input. For instance, the attacker computing device 602 may provide an input (e.g., an input x'), which may be an adversarial sample and/or may be used to craft an adversarial sample. The cloud computing platform 606 may receive the input (e.g., x') and provide the input into the ML model/classifier to determine an output. The classification vector may provide an ordered ranking of the classifications within a classification set, the ranking representing the confidence in each classifications prediction as the correct classification for the input. For example, the output may be a classification vector $\tilde{y}'$, which may be equal to the softmax function $\tilde{C}(x')$. For instance, as mentioned above, the output may include a plurality of probabilities associated with a plurality of classes. The highest ranked classification in the vector may therefore be the classification with the highest probability of being a correct prediction for the given input.

At block 706, the cloud computing platform compares a threshold parameter with the classification vector. At block 708, the cloud computing platform provides an output based on the comparison. For instance, the threshold parameter (e.g., $\omega$) may be a value that is between 0 and 1 (e.g., $\omega \in [0,1]$). The cloud computing platform may compare the maximum of the classification vector (e.g., max($\tilde{y}'$)) with the threshold parameter. Based on the comparison, the cloud computing platform provides an output. For instance, based on the max($\tilde{y}'$)≥$\omega$, the system returns max($\tilde{y}'$). For example, the max($\tilde{y}'$) may indicate a maximum value of an element within the classification vector (e.g., the largest probability value within the classification vector that is output by the ML model). Based on the maximum value being greater than or equal to the threshold parameter, the cloud computing platform may return max($\tilde{y}'$) (e.g., the maximum probability value) and/or a class associated with the max($\tilde{y}'$).

Based on max($\tilde{y}'$)<$\omega$, the cloud computing platform may perform a defense function. For instance, the cloud computing platform may compute an index using a password-based function (PBF). The PBF may include a PRF such as the PRF described above. The inputs to the PBF (e.g., the PRF) may include the input provided by the attacker computing device 602 (e.g., x') and/or the key K (e.g., the seed to the PRF) that is provisioned at the setup of the classifier. The output of the PBF may be the index. In some instances, the PBF may be the HMAC, which is described above. In some examples, a modulus operation may also be used. For example, the cloud computing platform may determine the index based on the PRF mod 2 (e.g., index←PRF(K, x') mod 2). The cloud computing platform may further determine the 2 highest classes of the classification vector (e.g., $\tilde{y}'$) For instance, the cloud computing platform may use top2←2 highest classes of $\tilde{y}'$ and return the top2[index]. For instance, based on the secret key K and the input x', the cloud computing platform may determine a bit string indicating one or more classes using the PRF and/or mod 2. Then, the cloud computing platform may use the top2 (e.g., whether the first or last bit is 1 or 0) to determine whether to provide the top class or the second class. The cloud computing platform may then determine the pseudo-random determined class to provide as an output of the enhanced classifier.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for thwarting evasion attacks on a machine-learning (ML) based classifier, the method comprising:
   obtaining a predetermined threshold parameter;
   determining, by the ML based classifier, a classification vector based on an input;
   evaluating the classification vector based on the predetermined threshold parameter to determine a threshold result;
   determining a classification prediction based on the threshold result by:
      selecting a highest ranked classification from the classification vector as the classification prediction if the threshold result is greater than or equal to the predetermined threshold parameter; or
      pseudo-randomly determining a classification from a classification set as the classification prediction if the threshold result is below the predetermined threshold parameter; and
   outputting the classification prediction.

2. The method of claim 1, wherein pseudo-randomly determining the classification from the classification set is constrained such that a same classification is selected upon each execution of the method for a same sample provided as the input.

3. The method of claim 1, further comprising generating a secret cryptographic key associated with the ML based classifier,
   wherein pseudo-randomly determining the classification comprises a key-based random selection using the secret cryptographic key.

4. The method of claim 3, wherein pseudo-randomly determining the classification further comprises:
   executing a password-based function (PBF) to compute an index using the input and the secret cryptographic key; and
   determining the classification based on the index.

5. The method of claim 4, wherein the PBF comprises a pseudo-random function (PRF), wherein executing the PBF comprises:
   using the input, the secret cryptographic key, and the PRF to generate a plurality of bits associated with the index.

6. The method of claim 5, wherein executing the PBF to compute the index further comprises:
   determining the index based on a modulus operation and the plurality of bits.

7. The method of claim 6, wherein the plurality of bits indicates two classifications from the classification set, and wherein determining the index comprises:
- using one or more bits from the plurality of bits to determine the index from the two classifications indicated by the plurality of bits.

8. The method of claim 1, wherein selecting of the highest ranked classification from the classification vector uses a maximum operation executed on the classification vector.

9. The method of claim 1, wherein the predetermined threshold parameter is set to indicate whether the classification vector represents a low confidence region for outputs from the ML based classifier.

10. The method of claim 1, wherein the ML based classifier is a neural network model trained to provide image classification, facial recognition, or autonomous driving.

11. The method of claim 1, further comprising deploying, by a cloud computing platform, the ML based classifier as a ML as a service (MLaaS).

12. A cloud computing system for thwarting evasion attacks on a machine-learning (ML) based classifier, the cloud computing system comprising:
- one or more processors; and
- a non-transitory computer-readable medium having processor-executable instructions stored thereon, wherein the processor-executable instructions, when executed by the one or more processors, facilitate:
  - obtaining a predetermined threshold parameter;
  - determining, using the ML based classifier, a classification vector based on an input;
  - evaluating the classification vector based on the predetermined threshold parameter to determine a threshold result;
  - determining a classification prediction based on the threshold result by:
    - selecting a highest ranked classification from the classification vector as the classification prediction if the threshold result is greater than or equal to the predetermined threshold parameter; or
    - pseudo-randomly determining a classification from a classification set as the classification prediction if the threshold result is below the predetermined threshold parameter; and
  - outputting the classification prediction based on the threshold result.

13. A tangible, non-transitory computer-readable medium having processor-executable instructions stored thereon which, upon being executed by one or more processors, alone or in combination, provide for execution of a method for thwarting evasion attacks on a machine-learning (ML) based classifier comprising the following steps:
- obtaining a predetermined threshold parameter;
- determining, using the ML based classifier, a classification vector based on an input;
- evaluating the classification vector based on the predetermined threshold parameter to determine a threshold result;
- determining a classification prediction based on the threshold result by:
  - selecting a highest ranked classification from the classification vector as the classification prediction if the threshold result is greater than or equal to the predetermined threshold parameter; or
  - pseudo-randomly determining a classification from a classification set as the classification prediction if the threshold result is below the predetermined threshold parameter; and
- outputting the classification prediction based on the threshold result.

14. The method of claim 1, wherein the threshold result indicates a confidence of the ML based classifier.

* * * * *